United States Patent
D'Amato, Jr.

[15] 3,688,648
[45] Sept. 5, 1972

[54] AUTOMATIC CONTROL VALVE SYSTEM FOR HYDRAULIC MOTOR

[72] Inventor: Michael A. D'Amato, Jr., 1200 E. Main St., Waukesha, Wis. 53186

[22] Filed: May 3, 1971

[21] Appl. No.: 139,459

[52] U.S. Cl. .................................91/412, 60/97 P
[51] Int. Cl. .........................................F15b 11/16
[58] Field of Search ..................91/412; 60/97 P

[56] References Cited

UNITED STATES PATENTS 2,060,220  11/1936  Kennedy ...................60/53 R
2,959,923  11/1960  Shook .........................60/97 P
2,988,891  6/1961   Hemings ......................60/97 P
3,435,616  4/1969   Waldorff ....................91/412 X Primary Examiner—Edgar W. Geoghegan
Attorney—James H. Littlepage

[57] ABSTRACT

Plural pairs of service ports are controlled by spool valves, each responsive to service port pressure, for connecting plural hydraulic motors in series-parallel, in series or in parallel depending upon loading of the motors, or upon externally controlled pilot valves.

10 Claims, 11 Drawing Figures

INVENTOR
MICHAEL D'AMATO

AUTOMATIC CONTROL VALVE SYSTEM FOR HYDRAULIC MOTOR

RELATED APPLICATION

D'Amato Ser. No. 86,700filed Nov. 3, 1970, for LOW SPEED HIGH TORQUE ROTARY HYDRAULIC MOTOR.

FIELD OF INVENTION

Fluid Handling, Line Condition Change Responsive Valves.

OBJECTS

The object of this invention is to provide a control valve system adapted for control of a plurality of hydraulic motors for alternately connecting the latter in series for high speed-low torque operation, or in parallel for low speed-high torque operation or, in the case of three motors, for connecting two of them in series with one another and the third in parallel with both the first two for medium speed-medium torque operation.

A particular object is to provide a system for accomplishing the above, which is entirely or partly automatic, and which, if automatic, shifts from one mode of operation to another in response to increase or decrease in motor loading as reflected in increase or decrease in motive fluid pressure.

A further object is to provide a control valve system for a plurality of hydraulic motors which is essentially symmetrical, and characterized by automatic reversibility in response to reversal in direction of the motive fluid input thereto.

Still another object is to provide, in an automatic control valve system shiftable between various modes for alternatively connecting motors in series or parallel, for interim mode free wheeling operation of one or more motors wherein, during the shifting of the system from one mode to another, none of the controlled motors is starved or blocked at any time from the motive fluid.

Yet another object is to provide for smooth but rapid shifting of the system from one mode to the other without hunting or chattering, with a minimum of check valves in the fluid circuit at any one time, and with a minimum of valves of any sort in the entire system. These and other objects will be apparent from the following specification and drawings, in which.

Figure 1:
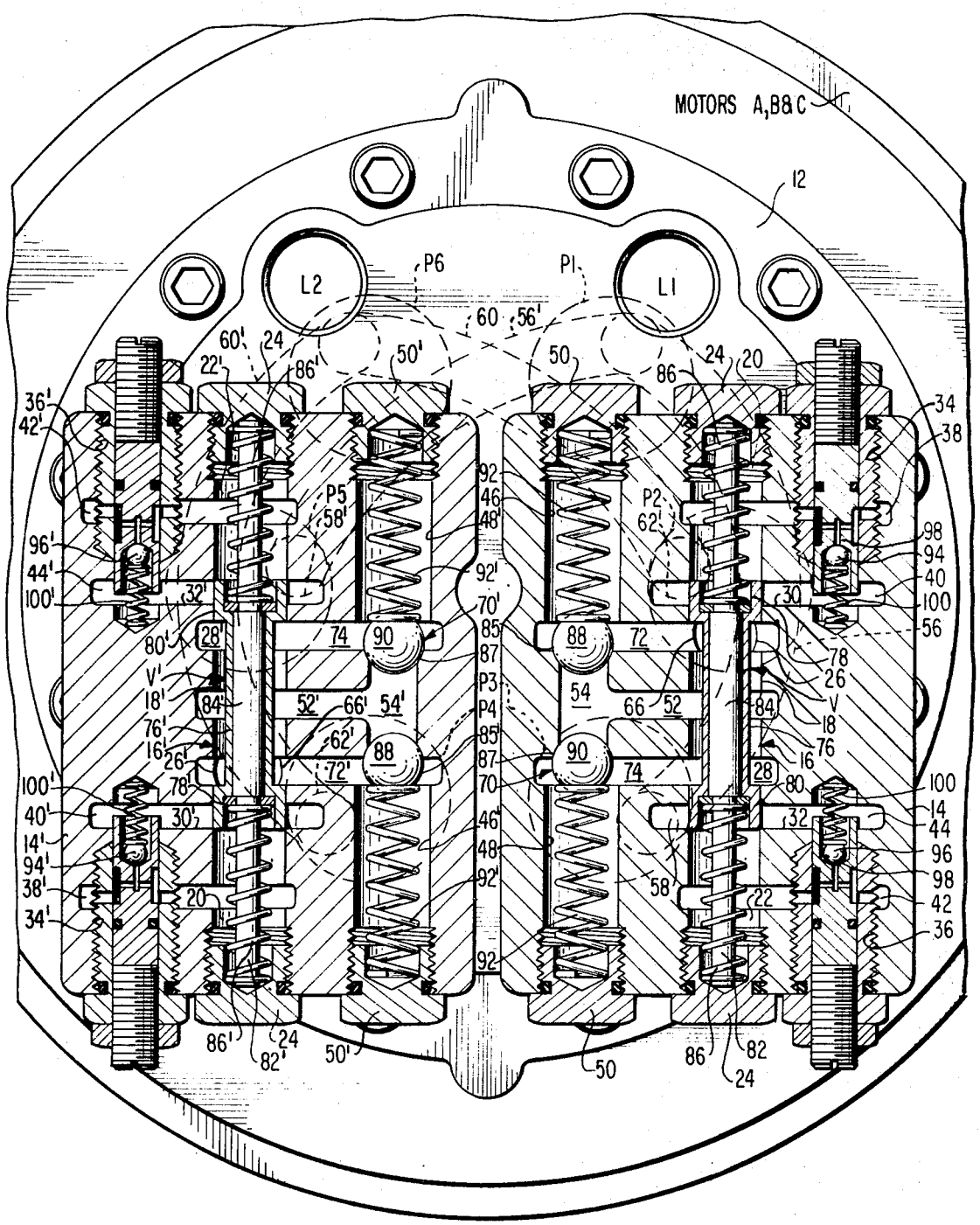
FIG. 1 is a cross-sectional view through a control valve assembly utilizing all pressure-responsive pilot valves, and operating in a mode for connecting three hydraulic motors in series per the FIG. 4 diagram.

Referring first to FIGS. 1 and 8-10, the ports, ducts and passages in the port cover plate and valve casing parts 14, 14' will first be described. Since the casing parts 14, 14' are identical, the same reference numerals will be used for corresponding elements in both ports, with prime numerals applied to the elements in casing port 14' which correspond to those previously designated by simple numerals in casing port; and except where necessary to explain fluid flow, only the casing 16 and associated valves, ports, etc. will be detailed.

On the back side of motors A, B and C is secured a port cover plate 12 containing fluid passages described hereinbelow, and on the back side of the port cover plate are secured two valve casings 14, 14' which are identical, although one is offset 180° from the other. The various bores, ports and ducts in the valve casings can thus be seen in FIGS. 8 and 10 which show the casing with the valves removed. In casing 14 is a main valve bore 16 having a central part 18 and opposite ends 20, 22 closed by plugs 24. The central part of the main valve bore has two service ports 26, 28 which, as will be apparent hereinafter, are connected to ports of the motors to be controlled, and two pump fluid ports 30, 32. "Pump fluid" as applied to these ports means that they may be connected to either the high pressure or low pressure side of a fluid pump (not shown) depending upon which direction it is desired to run the motors controlled by the valve system. Off to one side of the main valve bore are two pilot valve bores 34, 36. Pilot valve bore 34 is connected to the end 20 of the main valve bore by two channels 38, 40 and pilot valve bore 36 is likewise connected to the end 22 of the main valve bore by two channels 42, 44. Off to the other side of main valve bore 18 are two check valve bores 46, 48 whose ends are closed by plugs 50. At the center of main valve bore 18 is a center port 52 which is connected by channel 54 to the inner ends of both the check valve bores.

Figure 8:
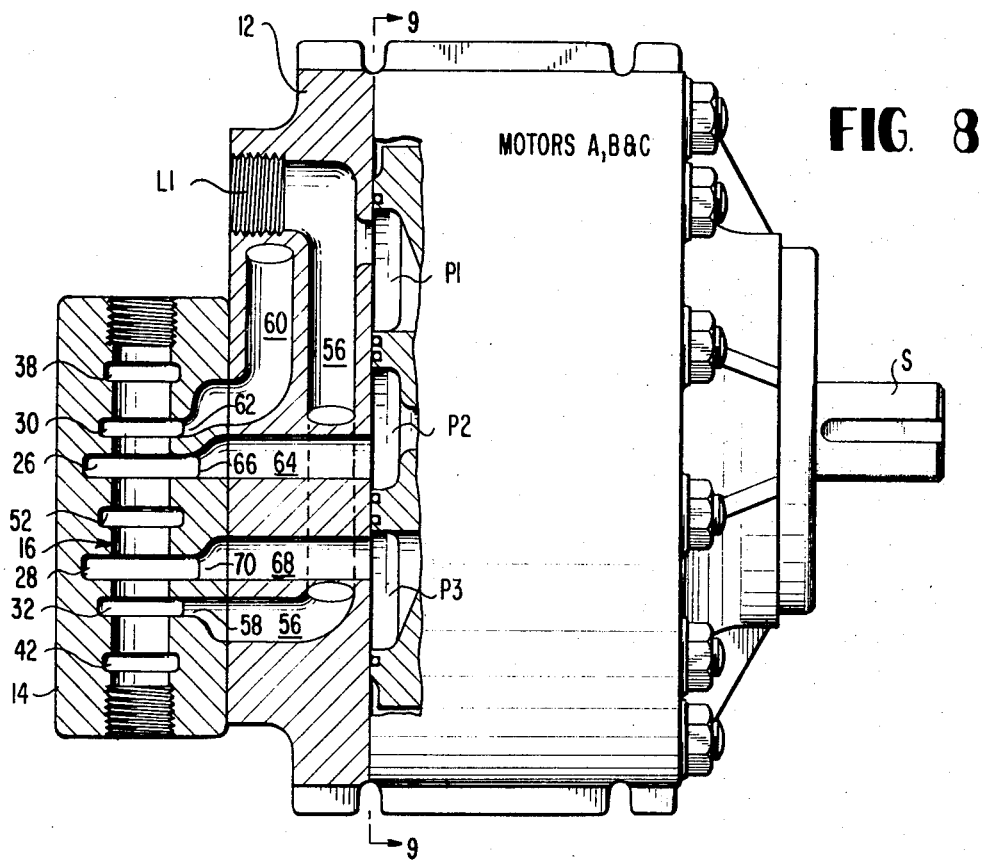
FIG. 8 is a side elevation of the motors for which the subject control system was designed, with the port cover plate and valve casing shown in cross section and with the spool removed.
Figure 9:
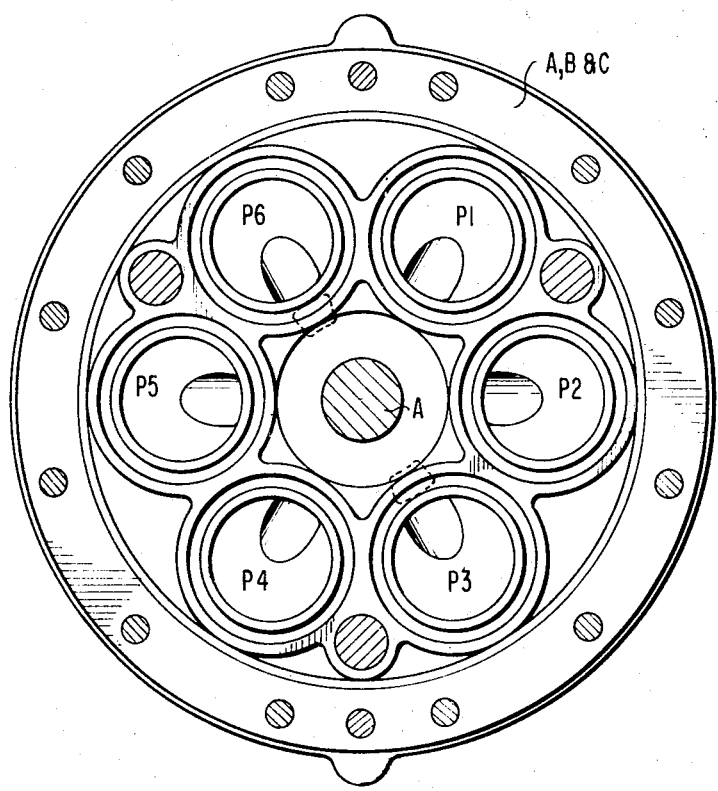
FIG. 9 is a view looking at the motor ports as seen along 9—9 of FIG. 8.
Figure 10:
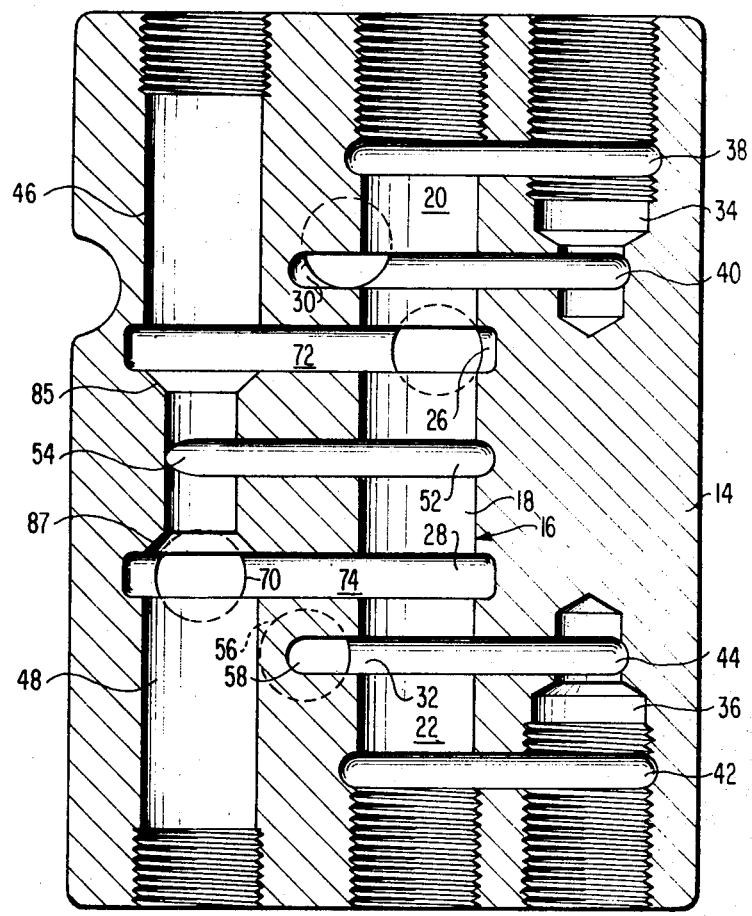
FIG. 10 is a cut-away view of one of the valve casings, with all valves removed, showing the various bores, ports and passages; and, FIG. 11 is a symbolic diagram of the embodiment shown in FIG. 3.

Referring primarily to FIGS. 8— there is in port cover plate 12 a duct 56 which runs from port L-1 to a juncture 58 with pump fluid port 32. On the other side is a matching duct 56' which runs from port L— 1 to a junction at 58' with pump fluid port 32'. Running from port L—2 in port plate 12 is a duct 60 which terminates at a junction 62 with pump fluid port 30; and likewise there is a matching duct 60' which runs from port L—2 to the terminus 62' with pump fluid port 30'. In port plate 12, communicating with motor port P—2, is a channel 64 which has a terminus at 66 with service port 26; and another channel 68 runs from motor port P—3 to a terminus at 70 with service port 28. In FIG. 1 the terminus 70 of channel 68 is concealed by check valve 90. It should be understood that on the other side of the system there is a channel indicated by the arrow in reference 70' which terminates beneath check valve 90' and which runs to motor port P—5. A duct 72 connects service port 26 with bore 46 of check valve 90.

Sliding lengthwise in main valve bore 16 is the main valve V which is of the spool type having a hollow shank 76 with the lands 78 and 80 at its opposite ends. In its neutral position the lands 78 and 80 coincide with the pump fluid ports 30 and 32 and, while this detail is of such small dimension that it does not appears on FIG. 1, the fact is that the extreme length of valve V—1, from land end to land end, is slightly less than the extreme distance, as measured longitudinally of the valve bore, between the extremities of pump fluid ports 30 and 32 so that when valve V is centered, a light crack exists between the pump fluid ports 30, 32 and the main valve bore 16.

Main valve V slides on a guide rod 82 which has an enlarged central portion 84 which is slightly less in diameter than the inner diameter of hollow shank 76 so as to establish an orifice O therebetween. This detail is also too small to see in FIG. 1, but it appears on the circuit diagram of FIG. 11. Main valve V is normally centered by springs 86.

Normally engaged against seats 85 and 87 in check valve bores 46, 48 are check valves 88, 90 of the ball type, biased against their seats by springs 92. Engaged in pilot valve bores 34, 36 are pilot valves 94 and 96, these being of the ball type which are biased against their seats 98 by springs 100. ball type pressure fluid flows directly to port P—1 of motor A, to which it is directly connected, and it also flows via duct 56 and terminus 58 to pump fluid port 32, from which it leaks past the end of land 80 and creates pressure in end 22 of bore 18. Because channels 42, 44 connect the bore end 22 to opposite sides of pilot valve 96, the latter remains closed on seat 98. Pressure fluid leaking through orifice O between guide rod portion 84 and the inner side of hollow shank 76 creates an equal pressure in the other end 20 of valve bore 16. Valve V—1 moves up slightly from its neutral position of FIG. 1, but only so much as to cause lane 78 to close off connection of the main valve bore with pump fluid port 30. In FIG. 1 condition, pressure fluid flows from port L—1 into port P—1 of motor A, out from port P—2 of motor A via channel 64 and junction 66 to service port 26, thence through the main valve bore 16 between the inner wall thereof and the outer side of valve shank 76 to service port 28 and across through duct 74 to the terminus 70 (beneath check valve 90) and thence through channel 68 (FIG. 8) to port P—3 of motor B, through motor B and back out its port P—4 through a channel in port cover plate 12 corresponding to channel 64 and to terminus 66' (see lower left hand part of FIG. 1), thence through the bore 18' of main valve V' to service port 28' and from there through a duct 74' to a channel terminus 70' beneath check valve 90' and through that channel to the port P—5 of motor C, thence through motor C and back via its port P—6 to return port L—2.

Figure 4:
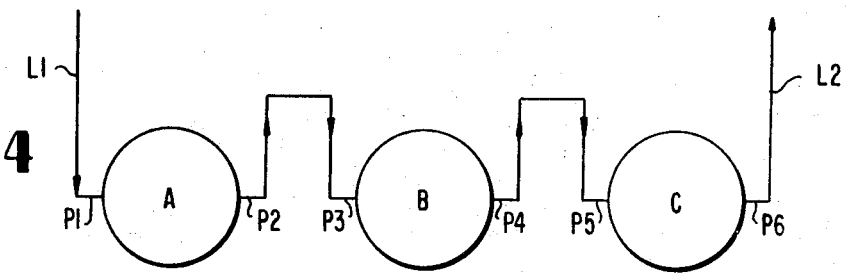
FIG. 4 is a diagram of the system operating in a three motor in series mode, per FIG. 1.

Thus all three motors A. B and C are in series and operating in the FIG. 4 mode.

PARALLEL OPERATION

Let it be assumed that the load on shaft s is increased. Increased load will be reflected by increased resistance to flow appearing at motor ports P–1, P—3 and P–5. In this case a corresponding increase in fluid pressure appears at pump fluid ports 32 and 32'. Let it be assumed for purposes of this illustration that pilot valve 94 has been adjusted so that the pressure exerted by it spring 100 is slightly less than the pressure exerted by spring 100' on pilot valve 94'. Increased fluid pressure in pump fluid port 58 does not effect pilot valve 98 because of equilibrium pressures thereon. However, the pressure fluid leaking through orifice O, between guide rod 84 and hollow shank 76 results in increased pressure in the end 20 of main valve bore 16 and this is transmitted through channel 38 so as to force pilot valve 94 off its seat 98. Pressure fluid flowing through the pilot valve and channel 40 is vented to L-2 via pump fluid port 30 and junction 62 and duct 60 to L-2. This causes valve V-1 to move to its FIG. 2 position and establish a FIG. 5 mode.

TRANSITIONAL OPERATION

Figure 2:
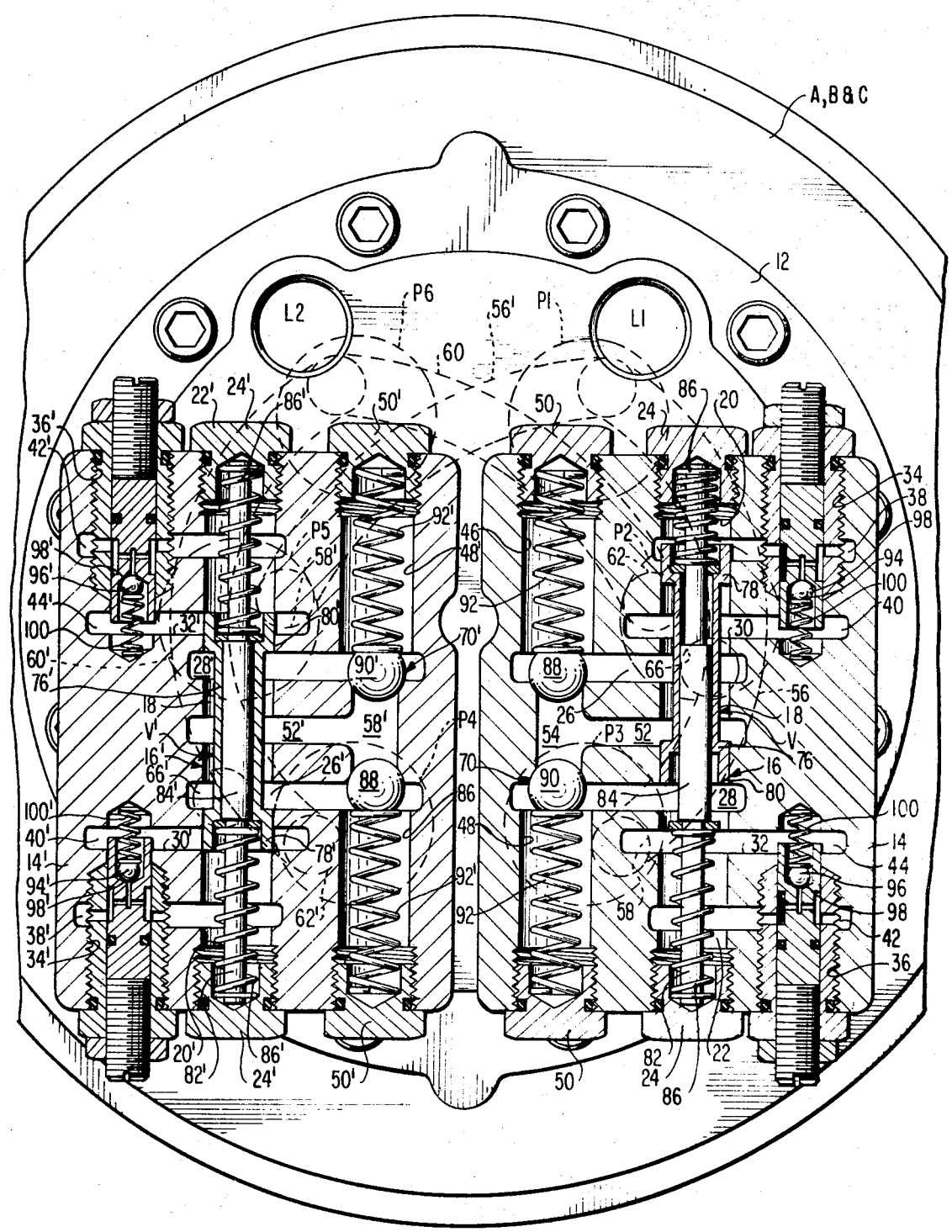
FIG. 2 is a view similar to FIG. 1, showing the same valve assembly, but operating in a mode for connecting two hydraulic motors in parallel and the third motor in series, per the FIG. 5 diagram.

In moving from the FIG. 1 to the FIG. 2 mode of operation, but for the check valves and associated channels, there would come a time, however short, when certain of the service parts 32 would be blocked, and this could be deleterious in a system where all the motors are connected to a common load. However, in the present mechanism when land 80 advances across service port 28 and thereby blocking flow to motor port P–3, pressure fluid exiting from port P–2 of motor A via junction 66 into service port 26 is able to flow to center port 52 and via common channel 54 against check valve 90 so as to force the latter away from its seat 87 and establish a flow path to motor port P—3 via junction 70 and channel 68. This transitional mode will continue until the high pressure oil from 56, 58 and 32 can enter 28, 74 and 70 in sufficient quantity to raise the pressure in this area above that existing in channel 54. When this occurs this higher pressure seats check valve 90 restricting flow in that direction.

PARALLEL--SERIES MODE

Figure 5:
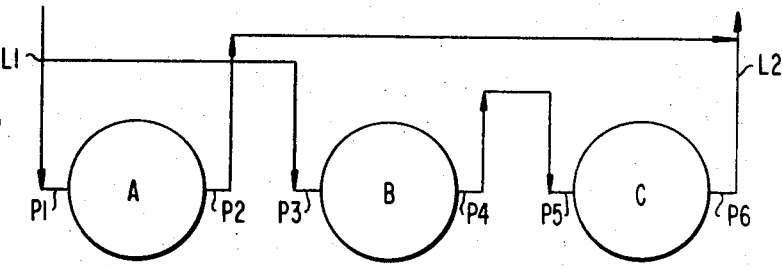
FIG. 5 is a diagram of the system operating with the first two motors in parallel per FIG. 2.
Figure 6:
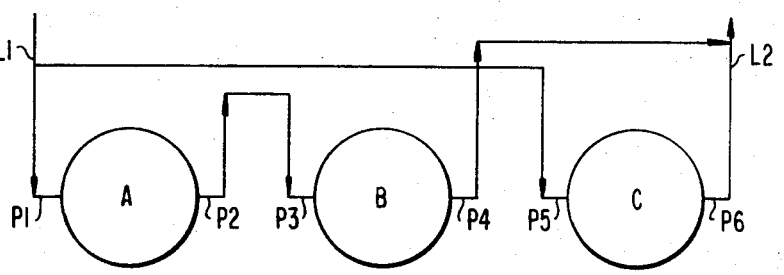
FIG. 6 is a diagram of the system with the first two motors operating in series, and the third motor in parallel with both, per FIG. 3.

When valve V reaches its FIG. 2 position, the mode illustrated in FIG. 5 is established. In this case pressure fluid from L–1 flows, as always, to port P-1 of motor A. However, now pressure fluid also flows from port L–1 to port P–3 of motor B via duct 56, junction 58, pump fluid port 32 and thence through part of main valve bore 16 to service port 28, thence via duct 74, junction 70, channel 68 to port P–3 of motor B. The flow from port P–4 of motor B to port P–5 of motor C remains as described in connection with the FIG. 1-1 FIG. 4 mode.

ALL PARALLEL OPERATION

Let it be assumed that the load on shaft s further increases, whereupon service port 32' sees increased pressure and the pressure fluid leaking through the orifice 0' between the enlarged portion 84' of guide rod 82' and the inner side of hollow shank 76' of valve V' builds up sufficiently to unseat pilot valve 98'. Valve V' then moves downwardly to its FIG. 3 position. In this case, fluid exhausting from port P-4 of motor B flows via service port 30' and part of main valve bore 18' to junction 66' and thence via channel 60' directly to fluid return port L-2. Then pressure fluid flows directly from port L-1 via channel 56' and junction 58' to motor fluid port 32' and thence down part of main valve bore 18' to duct 74' and across into junction 70' beneath check valve 90' and into port P-of motor C.

REVERSE OPERATION

Let it be assumed, with the valves in their FIG. 2 position, the high and low pressure relationship of ports l–1 and L–2 is suddenly reversed. This would bring about a reversal of the motors and the control valve mechanism would respond in the following way:

Pump fluid port 32 of valve V and the associated end 22 of the main valve bore 16 would then, because of their connection to L–1 via duct 56, be connected to low pressure fluid and thus the pressure which normally had maintained valve V in its FIG. 2 position would be relieved and valve V would return to its FIG. 1 neutral position under the influence of the upper centering spring 86. With both valves V and V' centered, the flow pattern would be the simple reverse of that described in connection with FIGS. 1 and 4. Assuming, however, the increased load on shaft s continues, then pump fluid ports 30 and 30' would be subjected to the increased fluid pressure from L–2 via the ducts 60, 60' and one or the other or both of pilot valves 96 or 96' would come into play. Assuming that valve 96 is the least resistant to pressure, then it would be forced off its seat, the fluid pressure in end 22 of main valve bore 16 would be relieved via channels 42 and 44, pump fluid port 32, junction 68 and duct 56 to L–1, and the then high pressure fluid in end 20 of main valve bore 16 would force valve V to a position completely opposite from its FIG. 1 position. In this case, pressure fluid would flow from port L–2 directly to port P–6 of motor C, through motor C and out via channel 70' and duct 74' to service ports 28', through main valve bore 16' to service port 26' and thence via junction 66' to port P–4 of motor B. The fluid exiting from port P–3 of motor B via channel 68 and junction 70 would enter service port 28 via duct 74 and flow via part of main valve bore 16 to pump fluid port 32 and back to L–1 via junction 58 and duct 56. Thus motors C and B would be in series. Port P–2 of motor A would receive pressure fluid from port L–2 via duct 60 junction 62 pump fluid port 30, part of main valve bore 16, service port 26, junction 66 and channel 64. Fluid exiting from port P–1 of motor A would flow directly to the then low pressure return port L–1. Motor A would then be in parallel with motors C and B.

Figure 7:
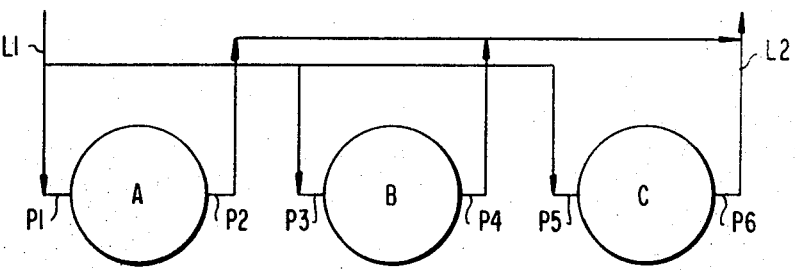
FIG. 7 is a diagram of the system with all motors operating in parallel.

With further increase in load on shaft s, the increase in fluid pressure appearing in pump fluid port 30' would unseat pilot valve 96' and valve V' would be forced upwardly, as seen in FIG. 1, and all three motors A, B and C would be in parallel and the flow would be the simple reverse of that illustrated in FIG. 7.

In all instances of shift of the valves V or V' to an end positon, the check valves 88, 90 or 88', 90' provide the transitional operations previously described so that no motor starvation or blockage occurs.

EXTERNAL CONTROLS

Figure 3:
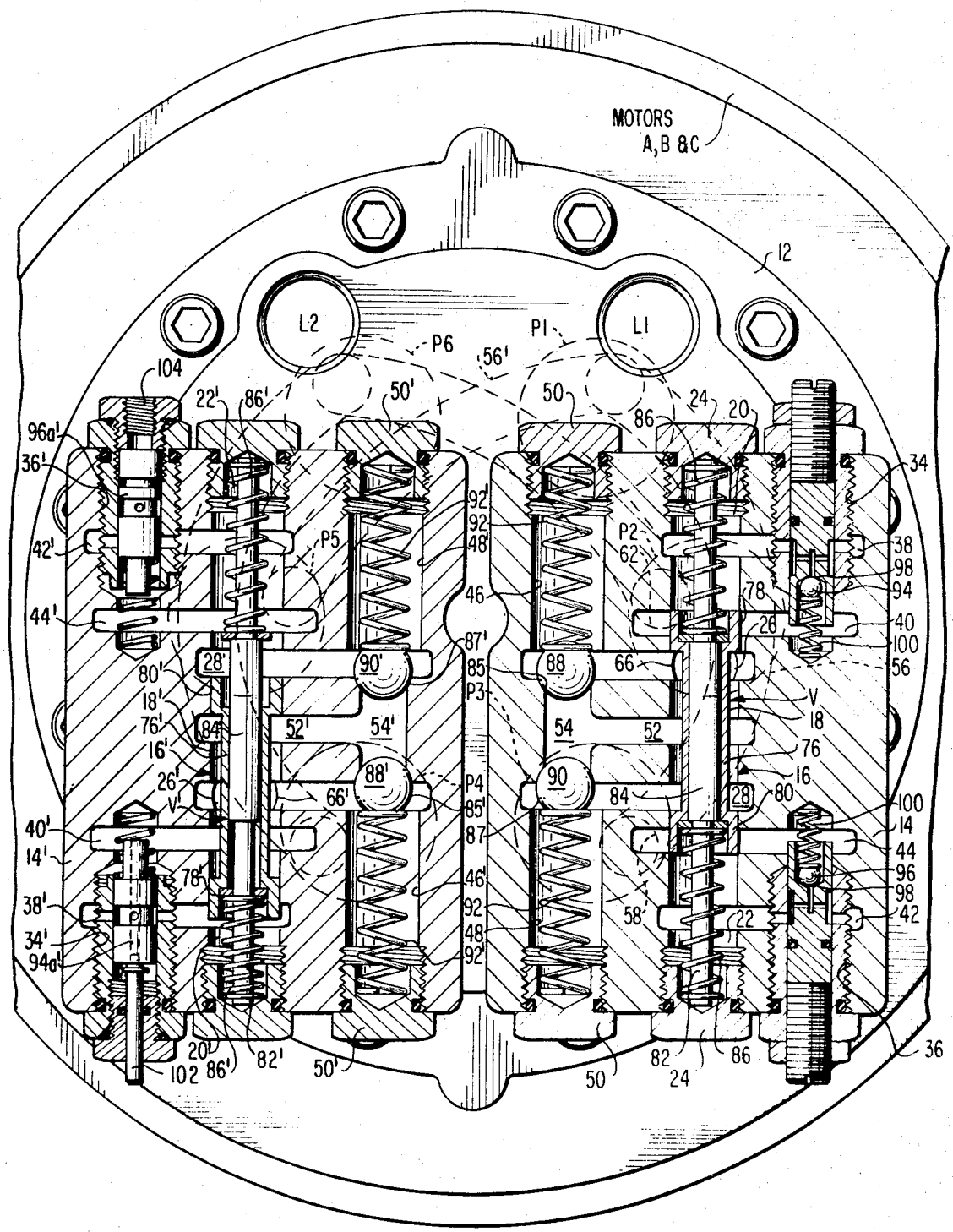
FIG. 3 is a view similar to FIGS. 1 and 2, but showing the valve assembly utilizing two of the pilot valves with external controls, one manual or solenoid controlled, and one hydraulically controlled, and operating in the FIG. 6 mode.

The embodiment of FIGS. 1 and 2 hereinbefore described is a fully automatic system utilizing four pressure-responsive pilot valves. However, one or more externally controlled pilot valves can be used. FIG. 3 illustrates an example wherein the pilot valves 94 and 96 which control valve V are, as in the FIG. 1 example, pressure responsive, and wherein the movements of valve V are automatic in response to pressure resultants of shaft load, but where valve 94a' is externally controlled by a rod 102, which may be manually manipulated or actuated by a solenoid; and valve 96a' is externally controlled by pressure fluid entering by its coupling 104. In the FIG. 3 example, valve 94a' has been opened. In this case motors A and B are in series, as they were in the FIG. 1 example, fluid exhausting from port P–4 of motor B returns to L—2 via junction 66', service ports 26' part of main valve bore 16', pump fluid port 30', and back to L–2 via duct 60'. Since valve V' is in the down position as seen in FIG. 3, pressure fluid flows directly from port L–1 via duct 56' and junction 58' to pump fluid port 32', down part of main valve bore 16' to service port 28', across duct 74' to junction 70', thence to port P–5 of motor C and through motor C and out its port P–6 to the low pressure return port L–2. Motor C will thus remain in parallel with motors A and B (which are in series with one another) until pilot valve 94a' is closed, whereupon equal pressures will be created in both ends 20', 22' of valve bore 16', and valve V' will be centered by its springs and motors A, B and C will thereby be connected in series.

Figure 11:
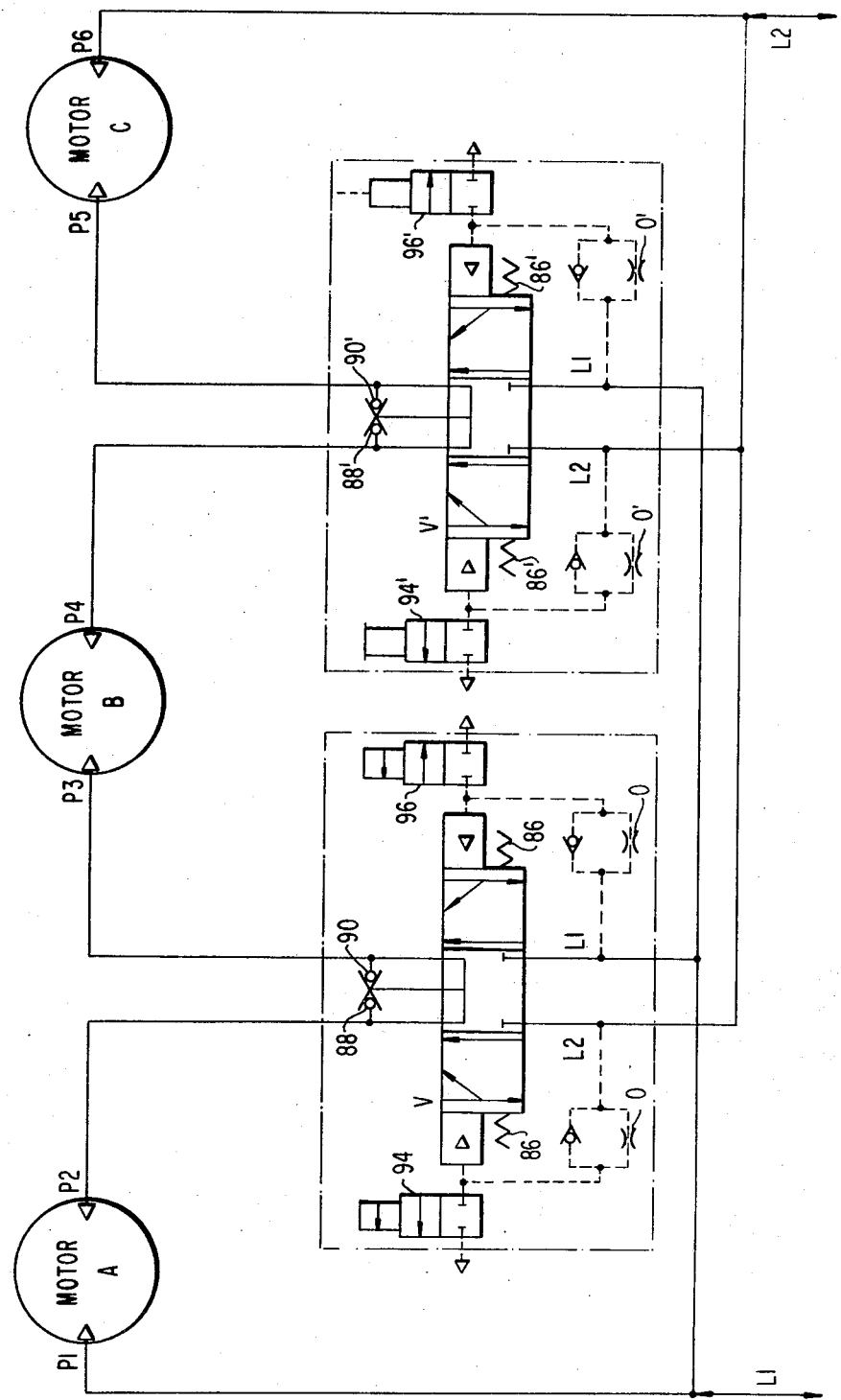

The flow diagram FIG. 11 represents the embodiments of FIG. 1 and 2 wherein all the pilot valves are pressure responsive. The symbols for V and V' represent pilot controlled spring centered valves. In the present instance, pressure is applied to both ends of the spool. When pressure is relieved on one end by a pilot valve, the spool moves in that direction. The orifice 0 or 0' on the diagram represents the clearance between the enlarged central portion 84 or 84' of the guide rod 82 or 82' and the inner side of the hollow shank 76 or 76' of valve V or V'. The check valve symbol in parallel with the orifice 0 is intended to represent the crack between the free end of a land 78 or 80, or 78' or 80', and the edge of pump fluid port 30 or 32, or 30' or 32' as the case may be. When the system is pressurized, the valve V or V' moves from its dead center position to a slightly advanced position wherein the crack prevails at one of the pump fluid ports, but wherein the other pump fluid port is blocked by the land on the other end of the valve.

While the controls executed by this system are sensitive, they move comparatively slowly and are not subject to hunting or chattering, and they use negligible amounts of power.

I claim:

1. A control valve system for connecting first, second and third hydraulic motors in series, in parallel, or in series-parallel with one another in a pump fluid circuit, each of which motors has first and second ports, one for connection with either one of the high or low pressure sides of the pump fluid circuit while the other is connected to the other side of the pump fluid circuit and which motors are reversible upon reversal of the direction of flow of pump fluid, comprising:

a first fluid conduit adapted to be connected to one side of the fluid circuit and to the first port of the first motor, a second fluid conduit adapted to be connected to the second port of the first motor, a third fluid conduit adapted to be connected to the first port of the second motor, a fourth fluid conduit adapted to be connected to the second port of the second motor, a fifth fluid conduit adapted to be connected to the first port of the third motor, and a sixth fluid conduit adapted to be connected to the other side of the fluid circuit and to the second port of the third motor, first and second valve means each having first and second pump fluid ports and first and second service ports, the first and second pump fluid ports of both valve means being respectfully connected to the first and second fluid conduits, the first service ports of the first and second valve means being respectfully connected to second and fourth fluid conduits and the second service ports of the first and second valve means being respectfully connected to the third and fifth fluid conduit, each of said valve means being shiftable between three positions, in the first of which the service ports thereof are connected together and fluid flow from the pump fluid ports to the service ports is substantially blocked, in the second and third of which positions the first service and first pump fluid ports are connected together and the second service and second pump fluid ports are connected together and means for shifting said first and second valve means between said positions.

2. The control valve system recited in claim 1, wherein said valve means are of the spool valve type reciprocating in valve bores, and wherein in the first position thereof they are centered and in the second and third positions thereof the spools are disposed towards respectively opposite ends of the bores, spring means for normally centering the valve means, and pilot valve means associated with the opposite ends of the bores for controlling relative fluid pressures therein, whereby to shift the valve means to said second and third positions by differential fluid pressures in the bore ends.

3. The combination claimed in claim 2, at least some of said pilot valve means being responsive to differential pressures prevailing at the pump fluid ports.

4. The control valve system recited in claim 2, at least one of said pilot valve means being externally controllable.

5. The control valve system recited in claim 1, wherein said valve means are of the spool type which, in the shifting of the valve from position to position could normally block fluid flow to or from at least one service port but for a transitional mode bypass system, said bypass system comprising pressure-responsive check valves and means providing fluid connections past the check valves from pump fluid ports to a service port in response to differential pressure in the service ports.

6. A control valve system for connecting first, second and third hydraulic motors in series, in parallel, or in a series-parallel with one another in a pump fluid circuit, each of which motors has first and second ports, one for connection with either one of the high or low pressure sides of the pump fluid circuit while the other is connected to the other side of the pump fluid circuit and which motors are reversible upon reversal of the direction of flow of pump fluid, comprising:

a first fluid conduit adapted to be connected to one side of the fluid circuit and to the first port of the first motor, a second fluid conduit adapted to be connected to the second port of the first motor, a third fluid conduit adapted to be connected to the first port of the second motor, a fourth fluid conduit adapted to be connected to the second port of the second motor, a fifth fluid conduit adapted to be connected to the first port of the third motor, and a sixth fluid conduit adapted to be connected to the other side of the fluid circuit and to the second port of the third motor, first and second spool valve chambers each having first and second pump fluid ports and first and second service ports, the first and second pump fluid ports of both valve chambers being respectfully connected to the first and second fluid conduits, the first service ports of the first and second valve chambers being respectfully connected to second and fourth fluid conduits and the second service ports of the first and second valve means being respectfully connected to the third and fifth fluid conduit means, first and second spool valves reciprocable in said chambers respectively between three positions, in the first of which the service ports thereof are connected together and fluid flow from the pump fluid ports to the service ports is substantially blocked, in the second and third of which positions the first service and first pump fluid ports are connected together and the second service and second pump fluid ports are connected together, and means for shifting said first and second spool valves between said positions.

7. The control valve system recited in claim 6, said first and second pump fluid ports being respectively disposed towards opposite ends of said valve chambers and the service ports being disposed relatively towards the center of the pump chamber, spring means for normally biasing the spool valves towards a central position, said spool valves having lands at the opposite ends thereof, and the distances between the lands being slightly less than the distances between the extremities of the pump fluid ports, whereby high pressure fluid from one of the fluid conduits leaks past a land end into one end or the other of each valve chamber, means providing an orifice between opposite ends of each valve chamber, the means for shifting the spool valves between said positions comprising pilot valves associated with the opposite ends of the chambers and operable to relieve the fluid pressure associated chamber end and thereby effect shifting of the spool valves.

8. The control valve system recited in claim 7, wherein at least one of said pilot valves is responsive to the pressure of fluid flowing through said orifice means.

9. A control valve system for connecting a plurality of hydraulic motors in series or in parallel with one another in a pump fluid circuit, each of which motors has first and second ports, one for connection with either one of the high or low pressure sides of the pump fluid circuit while the other is connected to the other side of the pump fluid circuit, comprising:
   a first fluid conduit adapted to be connected to one side of the pump fluid circuit and to the first port of one motor,
   a second fluid conduit adapted to be connected to the second port of said one motor,
   a third fluid conduit adapted to be connected to the first port of another motor,
   a fourth fluid conduit adapted to be connected to the other side of the pump fluid circuit and to the second port of the other motor,
   and valve means shiftable between first and second positions for alternatively connecting the second and third fluid conduits together while in the first position or for connecting the third and first fluid conduits together while connecting the second and fourth fluid conduits together while in the second position.

10. The combination claimed on claim 9, said valve means being normally in said first position and being responsive to pressure differential between pressure prevailing in said first and second conduits and shifting from the first to the second position in response to pressure differential above a predetermined norm.

* * * * *